(12) United States Patent
Meenan et al.

(10) Patent No.: US 7,752,329 B1
(45) Date of Patent: *Jul. 6, 2010

(54) MIGRATING CONFIGURATION INFORMATION BASED ON USER IDENTITY INFORMATION

(75) Inventors: Patrick Meenan, Gainesville, VA (US); Fady William Semaan, Ashburn, VA (US)

(73) Assignee: AOL Inc., Dulles, VA (US)

( * ) Notice: Subject to any disclaimer, the term of this patent is extended or adjusted under 35 U.S.C. 154(b) by 1028 days.

This patent is subject to a terminal disclaimer.

(21) Appl. No.: 10/284,486

(22) Filed: Oct. 31, 2002

(51) Int. Cl.
 *G06F 15/16* (2006.01)
(52) U.S. Cl. .................. 709/232; 709/217; 709/218; 709/219; 709/220
(58) Field of Classification Search ......... 709/217–220, 709/232
 See application file for complete search history.

(56) References Cited

U.S. PATENT DOCUMENTS

| | | | |
|---|---|---|---|
| 5,473,599 A * | 12/1995 | Li et al. ........................ 370/219 |
| 5,826,000 A | 10/1998 | Hamilton |
| 5,852,722 A | 12/1998 | Hamilton |
| 6,314,459 B1 | 11/2001 | Freeman |
| 6,360,264 B1 | 3/2002 | Rom |
| 6,516,417 B1 * | 2/2003 | Pegrum et al. ................ 726/15 |
| 6,615,166 B1 * | 9/2003 | Guheen et al. ................ 703/27 |
| 6,633,761 B1 | 10/2003 | Singhal et al. |
| 6,640,291 B2 * | 10/2003 | Fujibayashi et al. .......... 711/162 |
| 6,735,691 B1 * | 5/2004 | Capps et al. ..................... 713/1 |
| 6,744,753 B2 | 6/2004 | Heinonen et al. |
| 6,751,191 B1 * | 6/2004 | Kanekar et al. .............. 370/217 |
| 6,754,220 B1 * | 6/2004 | Lamberton et al. ........... 370/401 |
| 6,795,835 B2 * | 9/2004 | Ricart et al. ................. 707/204 |
| 6,834,341 B1 | 12/2004 | Bahl et al. |
| 6,854,009 B1 * | 2/2005 | Hughes ....................... 709/220 |
| 6,885,859 B2 | 4/2005 | Karaoguz et al. |
| 6,931,018 B1 * | 8/2005 | Fisher ......................... 370/401 |
| 6,961,762 B1 | 11/2005 | Yeap et al. |
| 6,985,931 B2 | 1/2006 | Dowling |

(Continued)

FOREIGN PATENT DOCUMENTS

WO WO 01/22661 3/2001

OTHER PUBLICATIONS

SonicWALL GMS Standard Edition Internet Security; http//www.sonicwall.com/products/gm_standard.html; pp. 1-4; date printed Feb. 27, 2004.

(Continued)

*Primary Examiner*—Ramy M Osman
*Assistant Examiner*—Avi Gold
(74) *Attorney, Agent, or Firm*—Fish & Richardson P.C.

(57) ABSTRACT

Techniques are provided for the configuration of a home-networking system. Home-networking configuration information may be stored on a host system in a manner accessible to the home-networking system and migrated to a home-networking gateway or router that has not yet been configured. Wireless configuration information may be stored on a home-networking gateway or router and used to configure one or more wireless access points through the use of a physical connection, such as a wired communications pathway. One or more wireless home-networking devices may be configured based on wireless configuration information stored in a central repository on a host system or a home-networking system. The wireless configuration information may be accessible only through the use of a security code.

67 Claims, 7 Drawing Sheets

U.S. PATENT DOCUMENTS

| | | |
|---|---|---|
| 7,042,988 B2 | 5/2006 | Juitt et al. |
| 7,058,719 B2 | 6/2006 | Motoyama |
| 7,069,346 B2* | 6/2006 | Lee .......................... 709/250 |
| 7,113,794 B2 | 9/2006 | Annamalai |
| 7,275,113 B1* | 9/2007 | Araujo ....................... 709/245 |
| 7,346,344 B2* | 3/2008 | Fontaine .................... 455/418 |
| 2002/0059434 A1 | 5/2002 | Karaoguz et al. |
| 2002/0132605 A1 | 9/2002 | Smeets et al. |
| 2002/0178380 A1* | 11/2002 | Wolf et al. ................. 713/201 |
| 2003/0050041 A1 | 3/2003 | Wu |
| 2003/0061077 A1* | 3/2003 | Sagar ............................ 705/5 |
| 2003/0208622 A1* | 11/2003 | Mosier ....................... 709/244 |
| 2003/0220091 A1 | 11/2003 | Farrand et al. |
| 2004/0250273 A1 | 12/2004 | Swix et al. |
| 2004/0261112 A1 | 12/2004 | Hicks, III et al. |
| 2005/0201395 A1* | 9/2005 | Wojtkiewicz ............... 370/401 |
| 2006/0155982 A1* | 7/2006 | Christensen et al. ........ 713/153 |

OTHER PUBLICATIONS

SonicWALL Global Management System Introduction Guide, Standard Edition, Version 2.5, pp. 1-36; 2003.

SonicWall Global Management System Configuration Guide, Standard Edition, Version 2.5 pp. 1-257; 2003.

* cited by examiner

MIGRATING CONFIGURATION INFORMATION BASED ON USER IDENTITY INFORMATION

TECHNICAL FIELD

This description relates to the configuration of a home network of computing devices.

BACKGROUND

In a home network of computing devices, a device on the network typically is set up or configured with particular information that enables communications with the other devices on the network. For instance, in a household that includes more than one personal computing device or digital entertainment device, a network may include a router that is configured to operate with each device and to direct communications between the devices. When a router is replaced or upgraded, the replaced or upgraded router may need to be configured to enable similar communications.

SUMMARY

In one general aspect, migrating configuration information based on user identity includes establishing a communications session between a user device and a trusted system through a home-networking gateway located between the user device and a trusted system device. A user identity is identified. Configuration information that is stored by the trusted system and associated with the user identity is accessed. The accessed configuration information is associated with the home-networking gateway. The accessed configuration information is sent to the home-networking gateway.

Implementations may include one or more of the following features. For example, the home-networking gateway may be configured based on the accessed configuration information. Configuration information that is associated both with a user identity and with a second home-networking gateway may be accessed. The accessed configuration information may be associated both with the home-networking gateway and with the user identity.

The user identity may include a master account, a family account, or a supervisory account. Configuration information may include, for example, a default parental control level for one or more devices that connect to the trusted system through the home-networking gateway, a parental control level for a particular device that connects to the trusted system through the home-networking gateway, an access restriction for a particular device that connects to the trusted system through the home-networking gateway, and one or more of identifying information for a home-networking gateway, device information used to configure the home-networking gateway, wireless configuration information used to configure wireless devices and wireless access points to communicate with the home-networking gateway, and protocol information used to configure the home-networking gateway, the wireless devices, and the wireless access points.

The trusted system may be a system provided by an Internet service provider or a system provided by an Internet access provider.

The accessed configuration information may be associated with the user identity on the trusted system and/or the home-networking gateway automatically in response to confirmation from a user associated with the user identity that confirms configuration information should be associated with the home-networking gateway or transparently to a user associated with the user identity. The configuration information accessed may be sent to the home-networking gateway automatically in response to confirmation from a user associated with the user identity that confirms configuration information should be associated with the home-networking gateway or transparently to a user associated with the user identity.

In another general aspect, migrating configuration information based on user identity includes establishing a communications session between a user device and a trusted system through a home-networking gateway located between the communication initiating software at the user device and an Internet access provider device. Configuration information that is associated with a user identity and a home-networking gateway on the trusted system is received. The received configuration information is stored on the trusted system for the purpose of configuring a device accessible to a home network.

Implementations may include one or more of the following features. For example, configuration information that is associated with a user identity and a home-networking gateway on the trusted system may be received automatically in response to confirmation or transparently to the user identity. The received configuration information may be stored on the trusted system automatically in response to confirmation or transparently to the user identity.

The configuration information may be received and stored when the user identity is authorized to access the trusted system. The configuration information may be received and stored when the user identity is authorized to access the trusted system and the configuration information is not associated with the home-networking gateway.

The received configuration information may be stored on the trusted system for the purpose of configuring one or more of a wired device, a wireless device, a wireless access point, or a home-networking gateway.

Implementations of the techniques discussed above may include a method or process, an apparatus or system, or computer software on a computer-accessible medium.

The details of one or more implementations set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Techniques are provided for the configuration of a home-networking system and/or particular components of such a system. Home-networking configuration information may be stored on a host system accessible to the home-networking system and migrated to a home-networking gateway or a router that has not yet been configured. Wireless configuration information stored on or accessible to a home-networking gateway or a router may be used to configure one or more wireless access points, generally through the use of a physical connection, such as a wired communications pathway. One or more wireless home-networking devices may be configured based on wireless configuration information stored in a central repository of the host system or the home-networking system. The wireless configuration information may be accessible only through the use of a security code.

Figure 1:
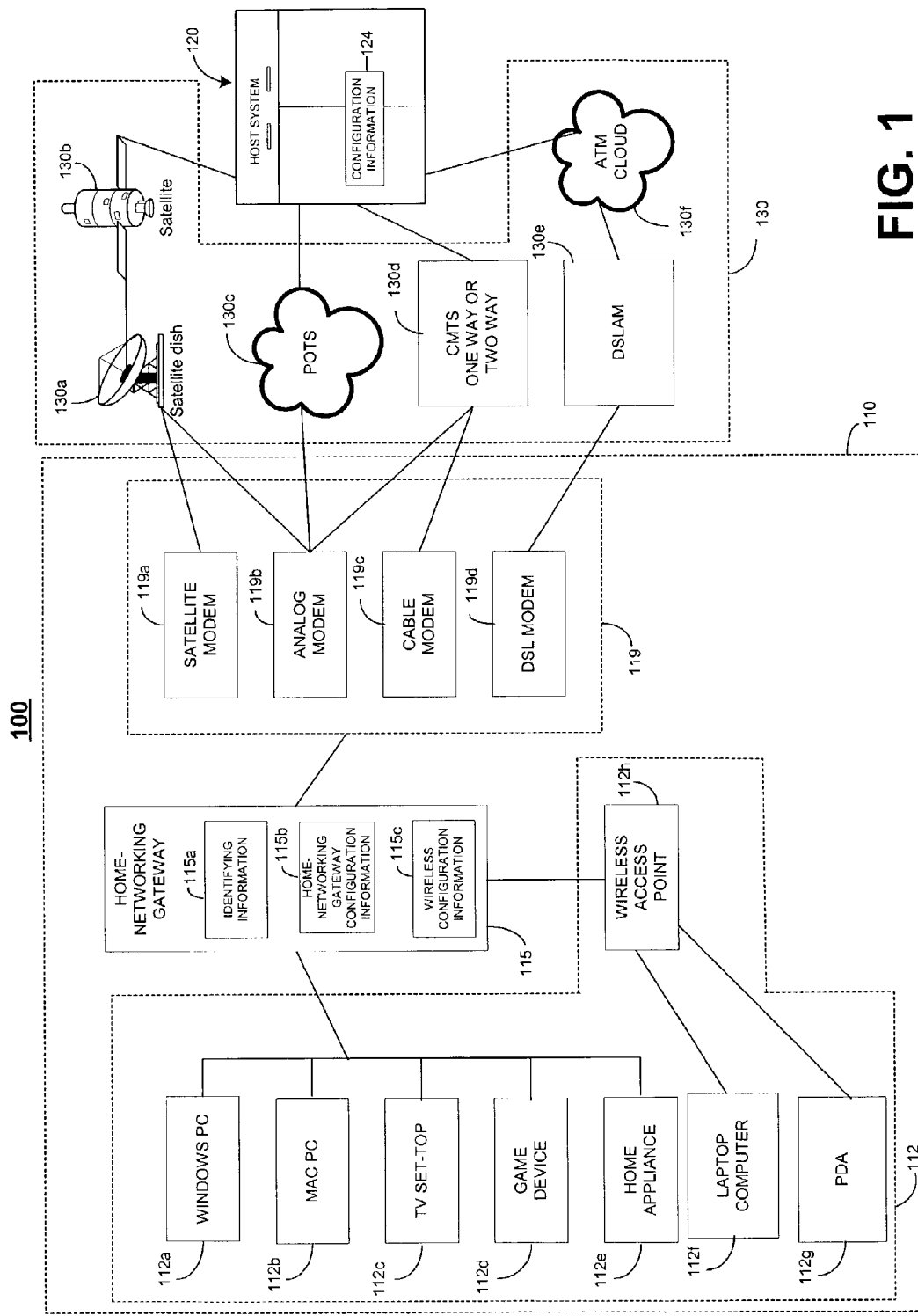
FIG. 1 is a block diagram illustrating an exemplary communications system capable of configuring devices used in a home network.

Referring to FIG. 1, a home networking system 100 includes multiple home-networked devices 112 ("devices") connected to each other and to a home-networking gateway 115. The home-networking gateway 115 is connected to a host system 120 through a communication device 119 over communication links 130.

The home networking system 100 enables the devices 112 to communicate with the host system 120 through the home-networking gateway 115 using the single communication device 119. The devices 112, the home-networking gateway 115, and the communication device 119 may be included in a home network 110 physically located in a personal residence (e.g., a single-family dwelling, a house, a townhouse, an apartment, or a condominium). The home-networking gateway 115 generally is local to the home network 110. The home-networking gateway 115 is located logically between the devices 112 and a host system 120 that is external to the home network 110. The host system 120 may be, for example, an Internet access provider device, an Internet service provider device, an online host system proxy server, or another external system device.

The devices 112 and the home-networking gateway 115 typically are located in a physical place that enables the home-networking gateway 115 to network with the devices 112. In one implementation, for example, the home-networking gateway 115 is physically located in a personal residence, and the devices 112 are physically located such that communications with the home-networking gateway 115 are enabled and maintained. For instance, when the home-networking gateway 115 is physically located in a personal residence, the devices 112 also may be physically located in the personal residence. However, the location of the home-networking gateway 115 in the personal residence does not necessarily preclude one or more of the devices 112 from being networked to the home-networking gateway 115 from a remote location. Similarly, the location of the home-networking gateway in the personal residence does not necessarily preclude use of one or more of the devices 112 from outside of the personal residence or communication by those devices with the host system 120 through the home-networking gateway 115. For instance, the devices 112 may include one or more portable computing devices that may be taken outside of the personal residence and still remain connected through a wireless access point to the home-networking gateway 115 located within the personal residence.

The devices 112 may include one or more general-purpose computers (e.g., personal computers), one or more special-purpose computers (e.g., devices specifically programmed to communicate with the home-networking gateway 115 and/or the host system 120), or a combination of one or more general-purpose computers and one or more special-purpose computers. Other examples of devices 112 include a workstation, a server, an appliance (e.g., a refrigerator, a microwave, and an oven), an intelligent household device (e.g., a thermostat, a security system, a heating, ventilation and air conditioning (HVAC) system, and a stereo system), a device, a component, other physical or virtual equipment, or some combination of these elements capable of responding to and executing instructions within the system architecture.

FIG. 1 shows several implementations and possible combinations of devices and systems used within the home networking system 100. For brevity, only a few illustrative elements are included in home networking system 100.

As illustrated by FIG. 1, examples of devices 112 may include, but are not limited to, a personal computer with a Windows™ OS 112a, a Macintosh™ personal computer 112b, a TV set-top box 112c, a game device 112d, a home appliance 112e, a laptop or otherwise portable computer 112f, a personal digital assistant (PDA) 112g, and a wireless access point (WAP) 112h. Some of the devices, such as a personal computer with Windows™ OS 112a, a Macintosh™ personal computer 112b, a TV set-top box 112c, a game device 112d, and a home appliance 112e, typically communicate with the home-networking gateway 115 through a wired network.

Some of the other devices, such as a laptop computer 112f and a PDA 112g, typically communicate with the home-networking gateway 115 using a wireless access point 112h. When devices communicate using wireless access point 112h, they may be referred to as wireless devices. Wireless devices are not limited to portable devices. For example, a desktop personal computer, such as a personal computer with a Windows™ OS 112a or a Macintosh™ personal computer 112b, may communicate using wireless access point 112h. Specifically, the wireless devices communicate over a wireless communications pathway to the wireless access point 112h. The wireless access point 112h is connected to home-networking gateway 115 through the wired network and transmits communications received from wireless devices to the home-networking gateway 115. In some implementations, the wireless access point 112h may be a component of the home-networking gateway 115.

A wireless communications pathway may use various protocols to communicate from a wireless devices to a wireless access point 112h. For example, the wireless communications pathway may use wireless technology based on the Institute of Electrical and Electronics Engineers, Inc. (IEEE) 802.11 standard (such as 802.11b or 802.11a). The wireless communications pathway also may use wireless technology based on the Bluetooth approach for short range wireless communications, other personal area network (PAN) technologies, or other wireless technology, such as the HiperLan2 standard by the European Telecommunications Standards Institute (ETSI).

Some of the devices 112, such as personal computer with Windows™ OS 112a, Macintosh™ personal computer 112b, laptop computer 112f, and PDA 112g, include software for logging on to the host system 120 using a particular user associated with the user of the device. Such devices may be referred to as client devices. Other devices, such as home appliance 112g, may include software for logging on to host system 120 without identifying an associated user of the user of the device. Yet other devices, such as TV set-top 112c and game device 112d, may be configured to function either as a client device or a non-client device depending on the function being performed.

The home-networking gateway 115 may include a home gateway device, such as a gateway, a router, or another communication device. The home-networking gateway 115 also may include a digital hub capable of receiving broadcast video signals, receiving communication data (such as through a broadband connection), and distributing the signals and data to devices 112. The home-networking gateway 115 may include another communications device and/or a home entertainment device, such as a stereo system, a radio tuner, a TV tuner, a portable music player, a personal video recorder, and a gaming device. The home-networking gateway 115 communicates with the host system 120 over communications links 130. In some implementations, host system 120 may be an online access provider, such as an Internet access provider or an Internet service provider.

The home-networking gateway 115 typically connects to the host system 120 using a communication device 119. Examples of the communication device 119 may include (and are not limited to) a satellite modem 119a, an analog modem 119b, a cable modem 119c, and a DSL modem 119d. The home-networking gateway 115 uses the communication device 119 to communicate through communication links 130 with the host system 120. The communication links 130 may include various types of communication delivery systems that correspond to the type of communication device 119 being used. For example, if the home-networking gateway 115 includes a satellite modem 119a, then the communications from a device 112 and an associated home-networking gateway 115 may be delivered to the host system 120 using a satellite dish 130a and a satellite 130b. The analog modem 119b may use one of several communications links 119, such as the satellite dish 130a and satellite 130b, the Plain Old Telephone Service (POTS) 130c, and the Cable Modem Termination System (CMTS) 130d. The cable modem 119c typically uses the CMTS 130d to deliver and receive communications from the host system 120. The DSL modem 119d typically delivers and receives communications with the host system 120 through a Digital Subscriber Line Access Multiplexer (DSLAM) 130e and an Asynchronous Transfer Mode (ATM) network 130f.

The home networking system 100 may use various protocols to communicate between the devices 112 and the home-networking gateway 115 and between the home-networking gateway 115 and the host system 120. For example, a first protocol may be used to communicate between the devices 112 and the home-networking gateway 115, and a second protocol may be used to communicate between the home-networking gateway 115 and the host system 120. In one implementation, the first protocol and the second protocol may be the same. In another implementation, the first protocol and the second protocol may be different. The home-networking gateway 115 may include different hardware and/or software modules to implement different home networking system protocols.

The home-networking gateway 115 may include identifying information 115a, such as a MAC ("Media Access Control") address and/or a network address, that may uniquely identify a home-networking gateway 115. The identifying information 115a also may include an identifier or a name assigned by the host system 120.

The home-networking gateway also may store configuration information, such as home-networking gateway configuration information 115b and wireless configuration information 115c. Home-networking gateway configuration information 115b may be stored in a table or a list on the home-networking gateway 115. The configuration information 115b may be associated with identifying information 115a for the home-networking gateway 115 and/or a user account that is permitted access to the host system 120.

The home-networking gateway configuration information 115b also may include device information for devices 112 associated with the home-network 110. Device information may include a device identifier for a device, such as devices 112a-112h. The device identifier may include a hardware device identifier, such as a MAC address, and/or a network address, such as a static IP address associated with the device or a dynamic IP address. The dynamic IP address may be assigned by home-networking gateway 115, by some other network device, or by the host system 120 through the Dynamic Host Configuration Protocol or another protocol that enables the dynamic allocation of an IP address to a device on a network. The device information associated with each device may include, for example, the type of device (e.g., a client or a non-client device), the class of device (e.g., a gaming device, a personal computer, or a PDA), the type of platform (e.g., the type of hardware, such as a Macintosh™ personal computer, a Windows™-based personal computer, a PDA, a home appliance, or an entertainment device), and/or the operating environment (e.g., the operating system type and/or version).

The device information also may include a user-assigned name. The user-assigned name may be referred to as a familiar name or a nickname. For example, an identifier for a particular game device may be associated with the user-assigned name of "Billy's game device."

The device information also may include parental control information or other types of access restrictions that are associated with the device. For example, a stereo system or other entertainment system connected to the network may not be accessible between the hours of 11 p.m. and 6 a.m. Similarly, a gaming device may be accessible only between the hours of 4 p.m. and 8 p.m. on weekdays and between the hours of 8 a.m. and 9 p.m. on a weekend day or a holiday. These types of access restrictions may be particularly beneficial when a household includes teenage children.

The home-networking gateway configuration information 115b may include protocol information necessary to configure the home-networking gateway 115 to communicate with devices 112. Protocol information may include protocol information that describes how to establish communication with one or more of devices 112, how to configure the wireless access point 112h, or how to configure wireless devices, such as the laptop computer 112f or the PDA 112g.

The wireless configuration information 115c may be stored in a table or a list on the home-networking gateway 115. The wireless configuration information 115c may include a security key, such as a wired equivalent privacy (WEP) key that may be used to encrypt and decrypt transmitted data, and a wireless network name, such as a service set identifier (SSID) that identifies the particular network. The wireless configuration information 115c also may include a list of devices that are permitted access to the home network. For example, the wireless configuration information 115c may include a list of MAC addresses that uniquely identify the devices that are permitted access to the home network. The wireless configuration information 115c also may include other configuration information, such as a level of encryption (e.g., 40-bit encryption or 128-bit encryption) associated with a WEP key. The storage of wireless configuration information 115c may be useful for a wireless device, such as laptop computer 112f that must maintain common configuration information with a wireless access point to enable communications with the wireless access point. For instance, a wireless device and a wireless access point may be required to maintain the following configuration information in common to enable them to communicate: a WEP key, a SSID, a list of devices that are permitted access, and a level of encryption associated with the WEP key (e.g., 40-bit encryption or 128-bit encryption).

The home-networking gateway 115 may be configured in a hub-and-spoke configuration in which the functions performed by the home-networking gateway 115 are distributed to other devices (e.g., a configuration information device) that are directed by the home-networking gateway 115. Alternatively, for example, the home-networking gateway 115 may be configured to include both the configuration information functions and the gateway functions. The home-networking gateway 115 also may be implemented in other network configurations.

The home-networking gateway 115 may send identifying information 115a and wireless configuration information 115c to wireless devices, such as the laptop computer 112f and the PDA 112g, and the wireless access point 112h. The devices and the wireless access point 112f may be configured based on the received wireless configuration information 115c.

The home-networking gateway 115 may communicate (e.g., send or receive) the identifying information 115a and the home-networking gateway configuration information 115b with the host system 120 using the communication device 119. The host system 120 may store the received identifying information 115a and the home-networking gateway configuration information as configuration information 124, and may associate the configuration information with a particular user account or a unique identifier for the home-networking gateway 115. When a home-networking gateway 115 is added to a home network (e.g., the previous home-networking gateway is upgraded or replaced), the host system 120 may provide the configuration information 124 to the home-networking gateway 115.

In certain implementations, the host system 120 may store configuration information 124 for each user account that includes a home-networking gateway, so as to provide access to a multiple devices. For example, as shown in the table below, the DavidKelly123 user account is associated with a home-networking gateway (with the identifier of 12345678); however, no configuration information for the home-networking gateway associated with the DavidKelly123 user account is stored on the host system 120. This may be so because the user of the DavidKelly123 user account has elected not to use the configuration management, automatic configuration, and/or configuration information backup functions of the host system 120. The host system 120 may include the DavidKelly123 user account in configuration information 124 for uses other than for configuring a home-networking gateway, a wireless access point, or a wireless device. For example, the DavidKelly123 user account may be used to enable the home-networking gateway 115 to access the host system 120.

| User account | Home-networking gateway | Device information for identified devices |
| --- | --- | --- |
| DavidKelly123 | 12345678 | |
| JaneJones234 | 23456789 | Device information for desktop computer 1 and laptop computer 2 |
| JohnSmith345 | 67890643 | Device information for laptop computer 1, desktop computer 2, game system 3, and PDA 4 |
| JohnSmith345 | 43567889 | Device information for laptop computer 1, desktop computer 2, game system 3, and PDA 4 |

The JaneJones234 user account is associated with a home-networking gateway (with the identifier of 23456789) that includes configuration information for a desktop computer and a laptop computer accessible through home-networking gateway 23456789.

The JohnSmith345 user account is associated with two home-networking gateways (with the identifiers of 67890643 and 43567889). Both home-networking gateways are configured to communicate with the same devices (specifically, laptop computer 1, desktop computer 2, game system 3, and PDA 4). The home-networking gateways are associated with the same configuration information. This may occur, for example, when a home-networking gateway is replaced with a different home-networking gateway. The home-networking gateway 43567889 may be deleted or otherwise disassociated with the JohnSmith345 account based on, for example, a user request or the passage of a predetermined amount of time after the storage of the configuration information in association with the second home-networking gateway (here, 67890643). In some implementations, configuration information 124 stored on the host system may include connection information, such as telephone numbers that may be used to connect the home-networking gateway 115 to the host system 120 and a user name and password used to enable dial-up for narrowband and broadband connections between the home-networking gateway 115 and the host system 120.

In some implementations, the host system 120 may send connection information to provide access to the home-networking gateway 115. The connection information may include, for example, an Internet Protocol (IP) address or another type of network address and a port to be used to establish a connection. In some implementations, connection information also may include a unique identifier assigned by the host system 120 for the home-networking gateway 115. The home-networking gateway 115 may receive the connection information. The home-networking gateway 115 may establish a connection with the host system using the received connection information.

The ability of a host system 120 to transfer the configuration information about one home-networking gateway 115 to a different home-networking gateway 115 may be useful because a process to configure a home-networking gateway 115 may be cumbersome and/or time-consuming and because the process of configuring a replacement home-networking gateway typically is redundant of a configuration process previously performed with respect to the home-networking gateway being upgraded or replaced. By the transfer of configuration information from the host system to the replacement home-networking gateway, the repetition of a cumbersome or time-consuming process may be reduced or avoided. The ability to transfer configuration information to a different home-networking gateway may be particularly beneficial when many devices are connected to the network.

In some implementations, the home-networking gateway 115 may perform as or include a wireless access point 112. Additionally or alternatively, the home-networking gateway 115 may communicate with devices using only a wireless communications pathway. In other implementations, the home-networking gateway 115 may communicate with devices using only a wired communications pathway. Additionally or alternatively, the home-networking gateway 115 may include one or more of a communications device 119 and/or one or more of devices 112.

Figure 2:
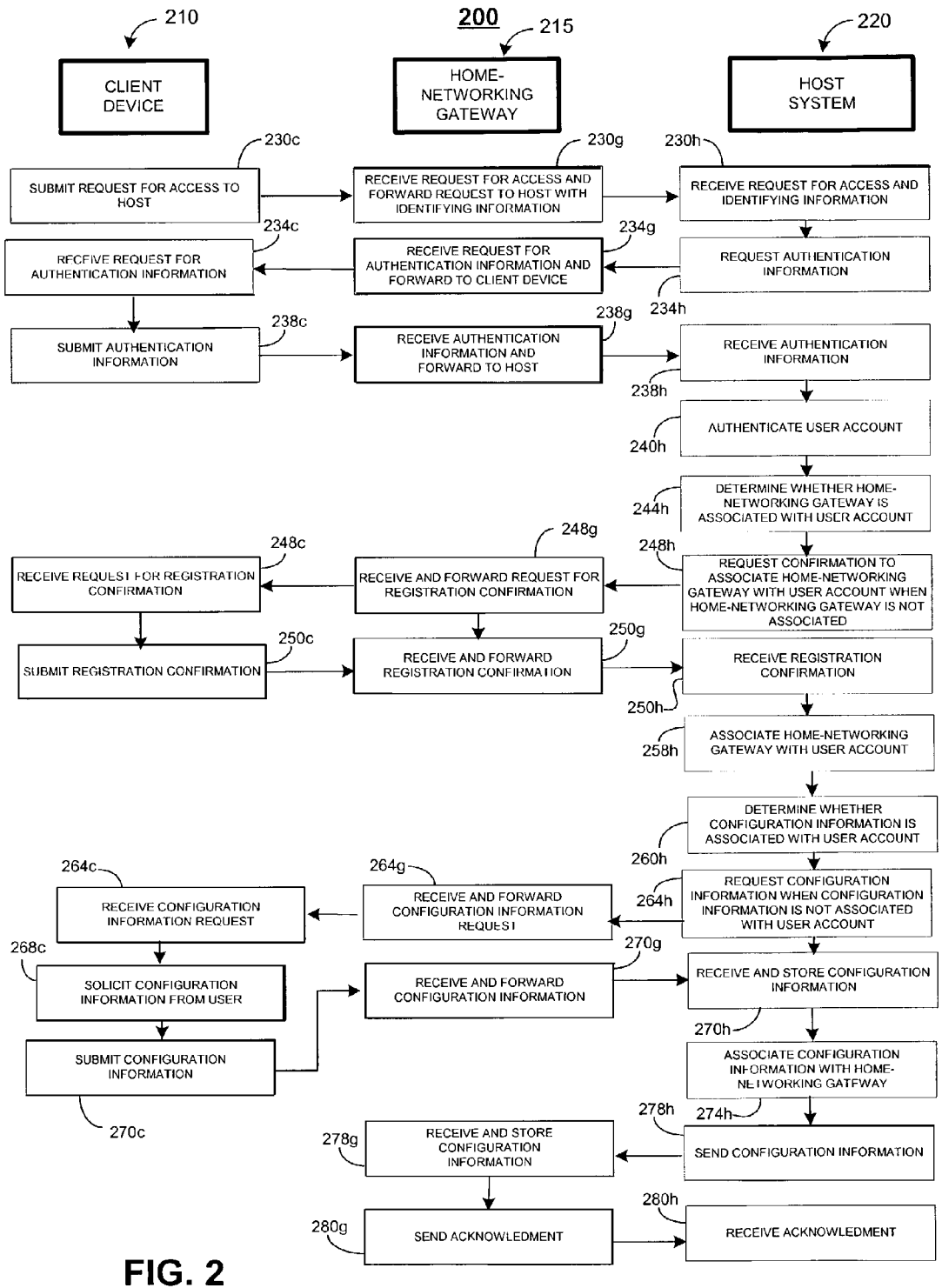
FIGS. 2 and 3 are block diagrams illustrating communications between a client device, a home-networking gateway, and a host system to configure the home networking gateway.

FIG. 2 shows a process 200 to configure a gateway used in a home network. Using process 200, the home-networking gateway is configured automatically in response to confirmation by a user. In some implementations, the home-networking gateway may be transparently configured such that the user is unaware that the configuration is occurring and/or user intervention, action, or response is unnecessary to accomplish the configuration of the home-networking gateway.

A client device 210 may be a device capable of logging on to a host system 220 through a user account. The client device 210 may be, for example, a personal computer with Windows™ OS 112a, a Macintosh™ personal computer 112b, a laptop computer 112f, or a PDA 112g described previously with respect to FIG. 1. The client device 210 communicates with a home-networking gateway 215, such as the home-networking gateway 115 of FIG. 1. The home-networking gateway 215 communicates with a host system 220, such as the host system 120 of FIG. 1.

The process 200 begins when the client device 210 submits a request for access to the host system 220 (step 230c). The home-networking gateway 215 receives the request for access and forwards the request to the host system 220 along with identifying information (step 230g). The identifying information may include a MAC address and/or a network address that may uniquely identify a home-networking gateway 215. The identifying information also may include information that identifies the client device 210 from which the access request was sent. For example, the identifying information may include the MAC address of the client device 210.

The host system 220 receives the request for access and identifying information (step 230h) and requests authentication information (step 234h). The home-networking gateway 215 receives the request for authentication information and forwards the request to the client device 210 (step 234g).

The client device 210 receives the request for authentication information (step 234c) and submits authentication information (step 238c). For example, the client device 210 may submit a user or screen name and a password or other authenticating information. The client device 210 may obtain authentication information to submit when a user of the client device 210 enters the authentication information or through the access of authentication information stored on the home network, such as home network 110 of FIG. 1. The home-networking gateway 215 receives the authentication information and forwards the authentication information to the host system 220 (step 238g).

The host system 220 receives the authentication information (step 238h) and authenticates the user account of the client device 210 (step 240h). If the host system 220 determines that the user account associated with the client device 210 is not authenticated, the host system may take any of several actions (not shown), including terminating the session immediately, sending a message to the client device 210, or sending a message to a master, family or supervisory account associated with the home-networking gateway 215.

When the host system 220 determines that the user associated with the client device 210 is an authenticated user, the host system 220 determines whether the home-networking gateway 215 is associated with the user account (step 244h). For example, this may be accomplished when the host system 220 includes a table or a list that associates a particular user account with a home-networking gateway identifier. The table or list may be indexed by user account, home-networking gateway identifier, or both. The host system 220 may access the table or list using the user name that was authenticated in step 240h. The host system 220 may determine whether the home-networking gateway identifier that had been included in the identifying information received in step 230h is associated with the user account.

When a home-networking gateway 215 is associated with a user account, the home-networking gateway 215 may be referred to as being a registered home-networking gateway. When the host system determines that the home-networking gateway 215 is associated with the user account (e.g., the home-networking gateway 215 is registered with the host system 220), the host system 220 permits the user associated with the client device 210 to access functions and services available from the host system 220.

When the host system 220 determines that the home-networking gateway 215 is not associated with the user account (e.g., the home-networking gateway 215 is not registered with the host system 220), the host system 220 requests confirmation from the user associated with the client device 210 that it is appropriate and desirable for the home-networking gateway 215 to be associated with the user account (e.g., the home-networking gateway 215 is to be registered) (step 248h). The home-networking gateway 215 receives the request for registration confirmation and forwards the request to the client device 210 (step 248g).

The client device 210 receives the request for registration confirmation (step 248c) and submits registration confirmation that the home-networking gateway 215 is to be associated with the user account (step 250c). For example, the client device 210 may submit the registration confirmation based on receiving a user response to a request for registration confirmation. The home-networking gateway 215 receives the registration confirmation and forwards the registration confirmation to the host system 220 (step 250g).

The host system 220 receives the registration confirmation (step 250h). The host system 220 associates the home-networking gateway 215 with the user account associated with the client device 210 (step 258h). For example, the host system 220 may store an association between an identifier for the home-networking gateway 215 and a user account in the table or list described previously with respect to step 244h.

The host system 220 determines whether home-networking gateway configuration information is associated with the user account (step 260h). For example, home-networking gateway configuration information may be associated with the user account when configuration information of another home-networking gateway 215 is associated with the user account. The host system 220 may determine whether home-networking gateway configuration information is associated with the user account, for example, by determining whether home-networking gateway configuration information is associated with another home-networking gateway 215 that is associated with the user account. The host system 220 may include a home-networking gateway configuration information table or list. The home-networking gateway configuration information may include information such as home-networking gateway configuration information 115b, as described previously with respect to FIG. 1. The home-networking gateway configuration information table or list may include an association of a particular home-networking gateway identifier with a particular collection of home-networking gateway configuration information. Each particular collection of home-networking gateway configuration information may be associated further with a particular user account through the association of a user account and a home-networking gateway, as described with respect to step 244h.

Figure 3:
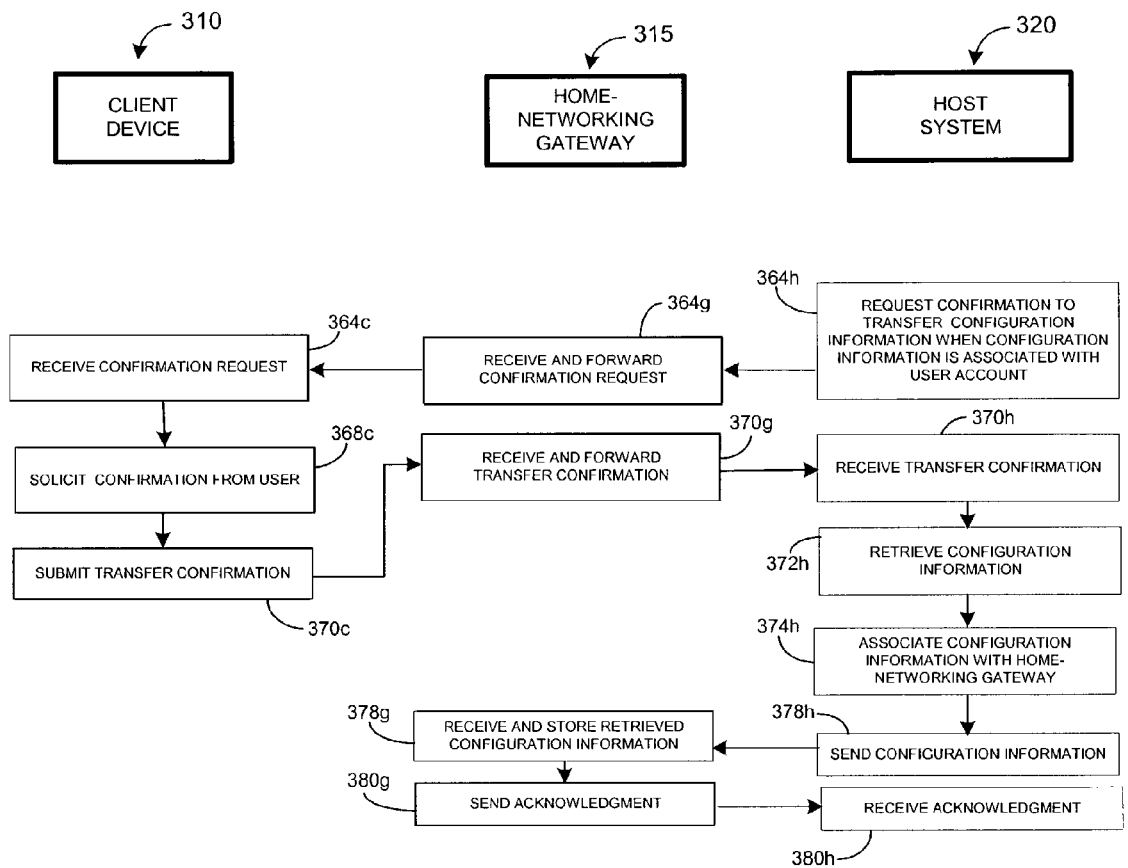

When the host system 220 determines that home-networking gateway configuration information is associated with the user account, the process 300 described below with respect to FIG. 3 is performed.

When the host system 220 determines that home-networking gateway configuration information is not associated with the user account (e.g., configuration information is not associated with a different home-networking gateway 215 that is associated with the user account), the host system 220 requests home-networking gateway configuration information from the user associated with client device 220 (step 264h). The request for configuration information may be associated with device information that the host system 220 has retrieved from the home-networking gateway 215. For example, the host system 220 may access device configuration information stored on the home-networking gateway 215 and may include the accessed device configuration information in the request for configuration information. The device configuration information may be device information as described with respect to home-networking gateway configuration information 115b of FIG. 1. In such a case, the accessed configuration information typically includes device information such as an identifier and a type of device for devices configured to operate with the home-networking gateway. The accessed configuration information typically does not include a user-assigned name, parental control information, or other access control information for the devices.

The configuration information requested may include a user-assigned name, such as a familiar name or a nickname, that may be used to identify the device, as described with respect to device information included in home-networking gateway configuration information 115b of FIG. 1. When the host system 220 applies different levels of parental controls (e.g., child, young teen, mature teen, and adult) to communications, and parental control information is not included in the accessed configuration information, the requested configuration information may include a default level of parental control for devices and identities that seek access to the host system through home-networking gateway 215 and/or a default level of parental control for each particular device. The host system may apply the default level of parental control associated with the home-networking gateway 215 absent association of a level of parental control with the device being used to access the host system or a user that is associated with the device. When a level of parental control is associated with a user using the device, the host system 220 may apply that level of parental control to communications with the device.

The home-networking gateway 215 receives and forwards the configuration information request to the client device 210 (step 264g). The client device 210 receives the configuration information request (step 264c).

The user of client device 210 enters configuration information using the client device 210 in response to a solicitation from client device 210 (step 268c). For example, the user may have entered a level of parental control to be applied to the identities and devices that seek access to the host system 220 through home-networking gateway 215. Additionally or alternatively, the user may have entered a user-defined name and/or default level of parental control for one or more devices on the home network. In some implementations, the user may indicate time of day and/or day of the week access restrictions that are associated with a particular device, as described with respect to home-networking gateway configuration information 115b in FIG. 1.

The client device 210 submits the configuration information entered by the user (step 270c). The home-networking gateway 215 receives and forwards the configuration information to the host system 220 (step 270g). The host system 220 receives and stores the configuration information (step 270h). The host system 220 may use the configuration information to apply parental controls. The host system 220 also may use the configuration information to provide this or other configuration information (e.g., 124 or 115b of FIG. 1) to a home-networking gateway 215 that is added to the home network or to an upgraded home-networking gateway 215.

The host system associates the stored configuration information with the home-networking gateway 215 (step 274h), for example, as described previously with respect to step 260h. The host system 220 then sends the configuration information to the home-networking gateway 215 (step 278h).

The home-networking gateway 215 receives and stores the configuration information in such a way as to configure the home-networking gateway 215 using some or all of the received configuration information (step 278g). In some implementations, the home-networking gateway 215 may apply the parental controls or access restrictions based on the stored configuration information. In such a case, the home-networking gateway may store the configuration information in a manner that enables application of parental controls using some or all of the received configuration information. This may require storage of some or all of the home-networking gateway configuration information a second time on home-networking gateway 215.

The home-networking gateway 215 sends to the host system 220 an acknowledgment that the configuration information was received and/or stored (step 280g) and the host system 220 receives the acknowledgment (step 280h). When the host system 220 does not receive an acknowledgment, the host system 220 may take one of several actions, such as re-sending the configuration information to the home-networking gateway or sending an electronic mail message to the user account to notify the user that an acknowledgment was not received.

In some implementations, the registration of a home-networking gateway and/or the configuration of the home-networking gateway or devices may be permitted only by a user associated with a master user account (such as a family account or a supervisory account) or may be permitted only for an account with registration and/or configuration privileges.

Additionally, in some implementations, the host system 220 may generate a password and may send the generated password to the home-networking gateway 215. In such a case, the home-networking gateway 215 receives the password and stores the password in persistent storage. The home-networking gateway 215 may use the password to establish subsequent connections with the host system 210. For example, the host system 220 may generate a password and send the generated password when a broadband connection between the home-networking gateway 215 and the host system 220 is established.

In some implementations, other data management techniques may be used. For example, the home-networking gateway configuration information table or list may associate each collection of configuration information with both a home-networking gateway identifier and a user account.

FIG. 3 shows a process 300 to configure a home-networking gateway 315 used in a home network by using configuration information stored on a host system 320 when networking gateway information is associated with a user account. Using process 300, the home-networking gateway is configured automatically in response to confirmation by a user of a client device 310. In some implementations, the home-networking gateway may be transparently configured such that the user is unaware that the configuration is taking place and/or user intervention, action or response are unnecessary to accomplish the configuration of the home-networking gateway.

The process 300 may be performed in relation to process 200 described previously with respect to FIG. 2. In this case, the process 300 begins when the host system 220, which corresponds to the host system 320, determines that home-networking gateway configuration information is associated with the user account in step 260h of FIG. 2.

When the host system 320 determines that home-networking gateway configuration information is associated with the user account, the host system 320 sends to the home-networking gateway 315 a request for the user associated with the client device 310 to confirm that the associated configuration information may be transferred to home-networking gateway 315 (step 364h).

The home-networking gateway 315 receives the confirmation request and forwards the confirmation request to the client device 310 (step 364g). The client device receives the confirmation request (step 364h). The user using the client device confirms the desire for transfer associated configuration information and hence for configuration of the home-networking gateway 315 in response to a solicitation from client device 310 (step 368c). For example, the user may confirm the transfer of configuration information when the user desires to configure a new or upgraded home-networking gateway. The user also may confirm the transfer of configuration information when the configuration information on the home-networking gateway has been lost, damaged, or is otherwise inaccessible or unusable by the home-networking gateway. When the user does not confirm the transfer of the configuration information, the process ends. When the user confirms the transfer of the configuration information, the client device 310 submits the transfer confirmation (step 370c).

The home-networking gateway 315 receives the transfer confirmation and forwards the transfer confirmation to the host system 320 (step 370g). The host system 320 receives the transfer confirmation (step 370h), and retrieves the configuration information, which may be associated with another home-networking gateway that is associated with the user account (step 372h). For example, the host system may lookup the user account and home-networking gateway in a table or list that stores configuration information and is indexed by user account, as described previously with respect to step 260h of FIG. 2. The configuration information associated with the other home-networking gateway that is associated with the user account then may be retrieved. The retrieved configuration information may include, for example, some or all of the device information for the devices associated with the home-network, as described with respect to home-networking gateway configuration information 115b of FIG. 1. The retrieved configuration information also may include parental control levels, other access restrictions, and other information described with respect to step 268c of FIG. 2.

The host system 320 associates the retrieved configuration information with the home-networking gateway 315 (step 374h). For example, the host system 320 may store a list of identifiers for home-networking gateways and a list of unique identifiers associated with particular sets of configuration information. To associate the home-networking gateway 315 with the configuration information, the host system 320 may add a record to the list that includes an identifier for the home-networking gateway and an identifier for the configuration information set. Other data management techniques also may be used, such as described previously with respect to steps 258h, 260h, and 274h of FIG. 2.

The host system 320 sends the retrieved configuration information to the home-networking gateway 315 (step 378h). The home-networking gateway 315 receives and stores the configuration information (step 378g), such as described previously with respect to step 278g in FIG. 2.

The home-networking gateway 315 sends to the host system 320 an acknowledgment that the configuration information was received and stored (step 380g). The host system 320 receives the acknowledgment (step 380h). When the host system 320 does not receive an acknowledgment, the host system 320 may take one of several actions, such as re-sending the configuration information to the home-networking gateway or sending an electronic mail message to the user account to notify the user that an acknowledgment was not received.

Figure 4:
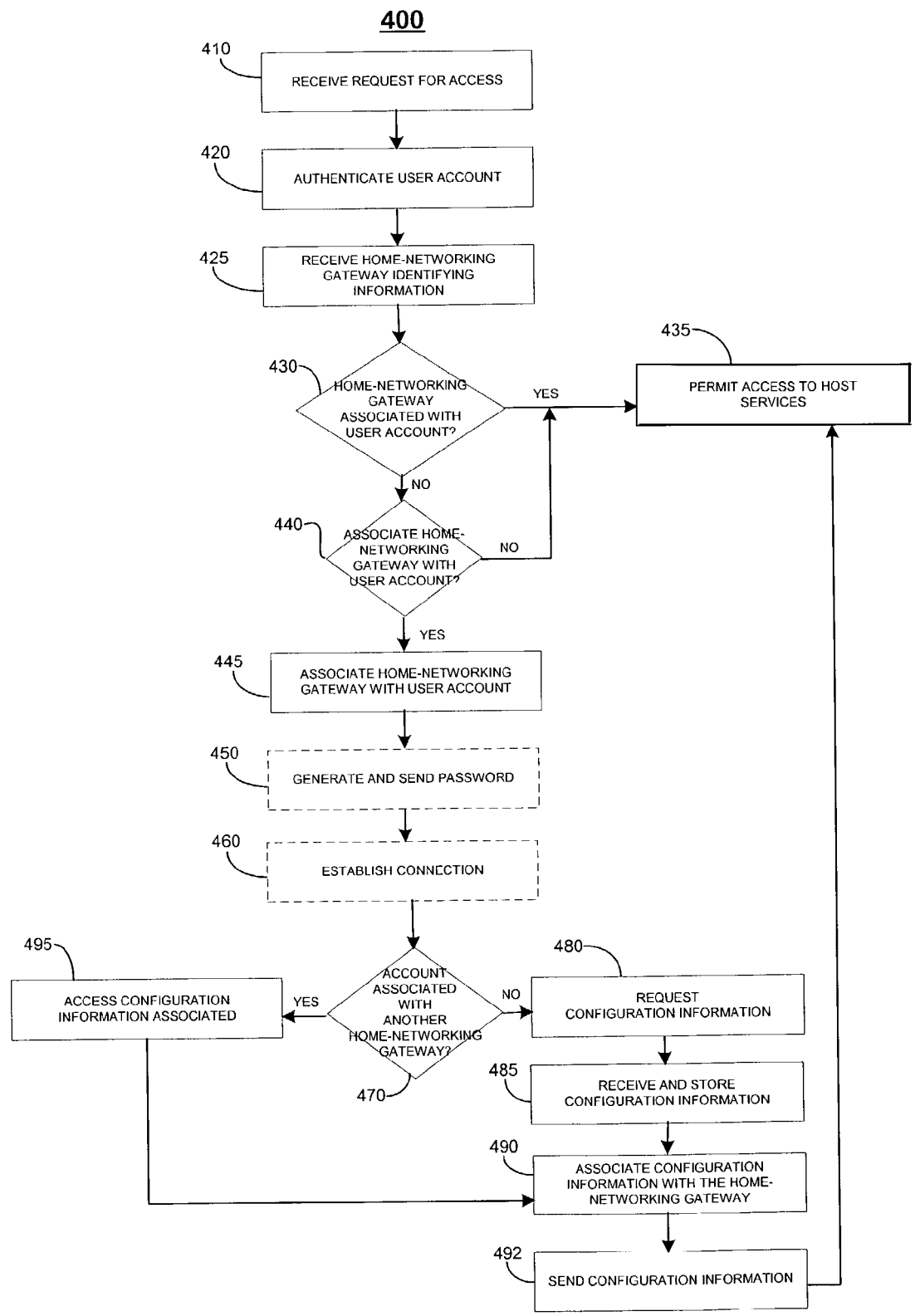
FIG. 4 is a flow chart of a process performed to configure a home networking gateway.

FIG. 4 illustrates a process 400 for configuring a home-networking gateway. The process 400 may be performed by a host system, such as host system 120 of FIG. 1, host system 220 of FIG. 2, or host system 320 of FIG. 3. The process 400 begins when the host system receives a request for access from a device associated with a user account of a user (step 410). The user account may be a supervisory account, a family account, a master account or another type of user account that is permitted to register a home-networking gateway and/or modify the configuration of the home-networking gateway.

The host system authenticates the user account (step 420). For example, the host system may authenticate the account by requesting authorization information, receiving authorization information, and authenticating the account based on the received authentication information, such as described previously with respect to steps 234h-240h of FIG. 2.

The host system receives home-networking gateway identifying information (step 425). This may be performed, for example, as described above with respect to steps 230g-230h of FIG. 2. In some implementations, the home-networking gateway identifying information may be received in response to a request for home-networking gateway identifying information sent by the host system to the home-networking gateway.

The host system determines whether the home-networking gateway is associated with a user account (step 430). This may be performed, for example, as described previously with respect to step 244h of FIG. 2. When the host system determines that the home-networking gateway has been associated with a user account, the host system permits the home-networking gateway to access host services (step 435).

When the host system determines that the home-networking gateway has not been associated with a user account, the host system determines whether to associate the user account with the home-networking gateway (step 440). This may be accomplished, for example, by requesting confirmation that the home-networking gateway is intended to be associated with the user account from a user associated with the device communicating through the home-networking gateway, such as described previously with respect to steps 248h-254h of FIG. When the user does not so confirm, the host system permits the home-networking gateway to access host services (step 435).

When the user confirms that the home-networking gateway is intended to be associated with the user account, the host system associates the home-networking gateway with the user account (step 445). This may be accomplished as described previously with respect to step 258h of FIG. 2.

The host system may optionally generate a password and send the generated password to the home-networking gateway (step 450). The host system also may optionally establish a connection with the home-networking gateway based on the password and/or additional connection information (step 460). For example, the host system may generate a password, send the password, and establish a new connection when a broadband connection between a home-networking gateway and a host system is established.

The host system determines whether configuration information is associated with a different home-networking gateway that is associated with the user account authenticated in step 420 (step 470). The determination of whether configuration information is associated with the home-networking gateway may be accomplished, for example, as described with respect to step 260h of FIG. 2.

When the host system determines that configuration information is not associated with the other home-networking gateway that is associated with the user account, the host system requests configuration information (step 480). For example, the host system may access device configuration information from the home-networking gateway and/or may request additional configuration information from the user associated with the account, such as described with respect to step 264h of FIG. 2. The host system receives and stores configuration information (step 485). This may be accomplished by performing step 270h of FIG. 2.

The host system associates the stored configuration information with the home-networking gateway and the account, such as described with respect to step 274h of FIG. 2 and step 374h of FIG. 3 (step 490). The host system also may send the configuration information to the home-networking gateway (step 492). This may be accomplished by performing step 278h of FIG. 2 or step 378h of FIG. 3. The host system then permits the home-networking gateway to access host services (step 435).

When the host system determines that configuration information is associated with another home-networking gateway associated with the user account, the host system accesses that configuration information (step 495). This may be accomplished, for example, as described with respect to step 372h of FIG. 3. The host system then associates the accessed configuration information with the home-networking gateway and the user account (step 490) and proceeds as previously described.

Figure 5:
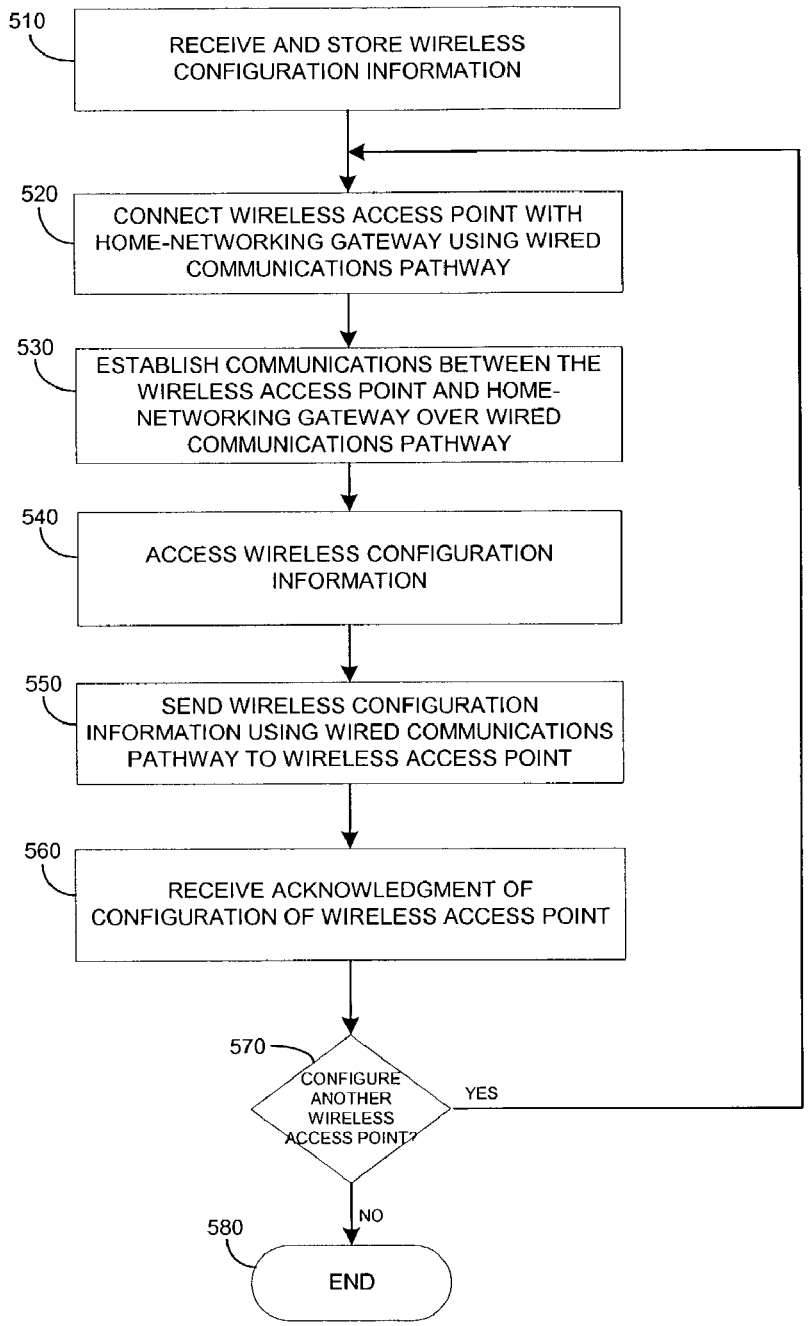
FIG. 5 is a flow chart of a process performed to configure one or more wireless access points.

FIG. 5 illustrates a process 500 that may be used to configure one or more wireless access points. The process 500 may be performed by a home-networking gateway that may optionally include a wireless access point or otherwise be configured to communicate over a wireless communications pathway. Examples of a home-networking gateway that may perform process 500 include home-networking gateway 115 of FIG. 1, home-networking gateway 215 of FIG. 2, or home-networking gateway 315 of FIG. 3, each of which have been described previously.

The process 500 begins when a home-networking gateway receives and stores wireless configuration information (step 510). Wireless configuration information may include a security key and a network name, as described previously with respect to wireless configuration information 115c of FIG. 1. Reception and storage of configuration information may occur during the manufacturing or distribution process of the home-networking gateway. For example, the home-networking gateway may be pre-configured with wireless configuration information at a factory or distribution point. Alternatively or additionally, the home-networking gateway may receive the wireless configuration information by accessing storage media (including magnetic, optical or solid state storage media) or any type of storage device (including a drive, a microdrive, a compact disc (CD), a recordable CD, a rewriteable CD, a flash memory, or a solid-state floppy disk card) that stores the wireless configuration information. The home-networking gateway also may receive the wireless configuration information from a user interface of the home-networking gateway through which a user may enter wireless configuration information to be stored by the home-networking gateway. The home-networking gateway also may receive the wireless configuration information when the user configures another wireless device.

The home-networking gateway is connected to a wireless access point, such as described with respect to item 112h of FIG. 1, using a wired communications pathway (step 520) and communications are established between the home-networking gateway and the wireless access point using the wired pathway (step 530). The wired communications pathway may be a wired communications pathway of a wired network. The wired communications pathway also may be a wired communications pathway provided through a wire specifically designed to connect a wireless access point to a home-networking gateway (and not designed for general network communications).

The home-networking gateway and the wireless access point establish communications using a protocol known to both devices. For example, UPnP ("Universal Plug and Play") may be used. When a wire is plugged into the wireless access point, the wireless access point may announce its presence by sending a message over the wire. The home-networking gateway may receive the message and detect the wireless access point based on the received message. The home-networking gateway may send to the wireless access point a reply message announcing the presence of the home-networking gateway.

The home-networking gateway accesses wireless configuration information previously established for the wireless network, generally with respect to another wireless device (step 540). The wireless configuration information may be stored on the home-networking gateway or may be otherwise accessible to the home-networking gateway. For example, wireless configuration information may be stored on a persistent storage device that is accessible to the home-networking gateway through a network connection or other connection between the home-networking gateway and the persistent storage device.

The home-networking gateway may access configuration information transparently to the user, such that the user is unaware that configuration information is accessed. Alternatively, the home-networking gateway also may access configuration information automatically in response to user confirmation that the connected wireless access point is to be configured. The home-networking gateway may access configuration information stored on a host system, such as in a manner described with respect to FIG. 2 and/or FIG. 3.

The home-networking gateway sends the wireless configuration information using the wired communications pathway to the wireless access point (step 550), and the wireless device uses this information for configuration and sends a confirmation (not shown). Later, the home-networking gateway receives an acknowledgment sent by the wireless access point that the wireless access point has been configured using the wireless configuration information (step 560). In some implementations, the home-networking gateway may perform the configuration of the wireless access point in lieu of receiving an acknowledgment that the wireless access point has been configured. For example, the home-networking gateway may do so by remotely initiating a configuration process on the wireless access point and sending configuration information (e.g., by using a remote procedure call).

When another wireless access point subsequently is connected and needs configuration (step 570), the process 500 continues with the connection of a different wireless access point to the home-networking gateway, as described previously with respect to step 520.

When no other wireless access point is to be configured (step 570), the process 500 ends (step 580).

In some implementations, the wireless access point may pull information from the home-networking gateway in addition to or in lieu of the home-networking gateway sending the wireless configuration information in step 550.

The process 500 enables several advantageous features, some of which are described below. The process 500 allows a user to enter the wireless configuration information once and use the entered wireless configuration information to configure more than one wireless access point automatically in response to a confirmation of a user. In some cases, the entered wireless configuration information may be used to configure a wireless device transparently such that the user is unaware that the wireless device has been configured. The process 500 may be particularly beneficial when multiple wireless access points are to be configured for use in a single network. Additionally or alternatively, the process 500 may allow a more convenient user interface for the configuration of even a single wireless access point over conventional interfaces provided through a wireless access point.

Figure 6:
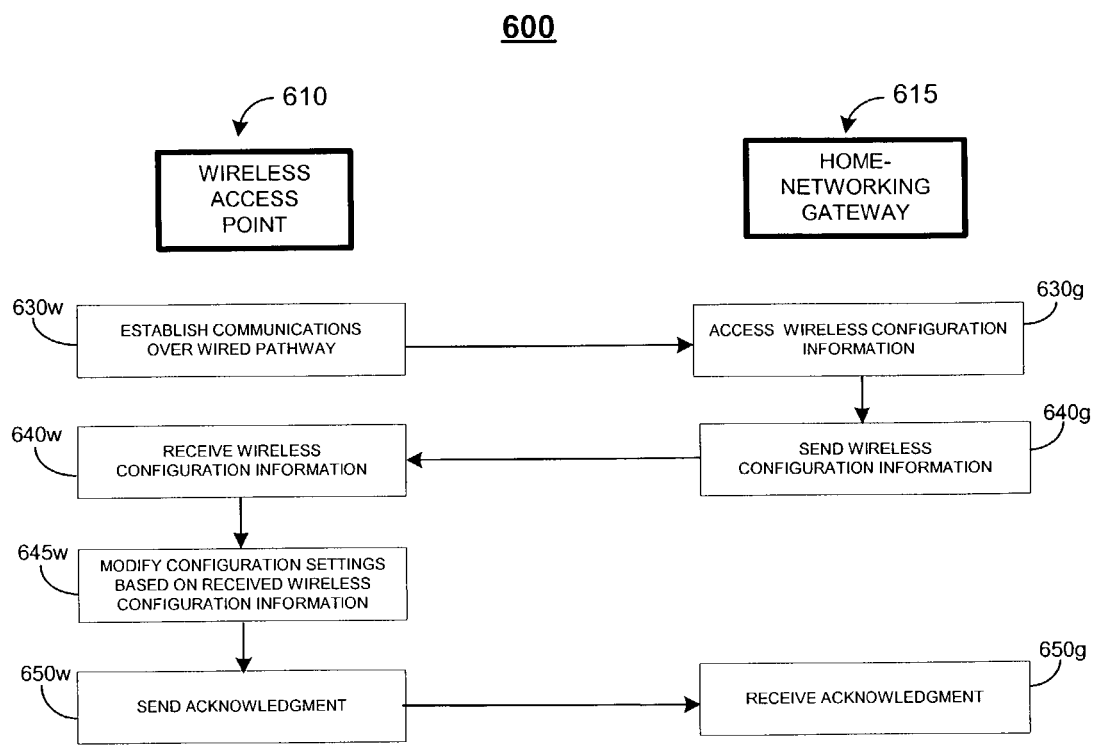
FIG. 6 is a block diagram illustrating communications between a wireless access point and a home-networking gateway to configure the wireless access point.

FIG. 6 shows a process for communicating between a wireless access point 610 and a home-networking gateway 615 to configure the wireless access point 610. The wireless access point 610 may be a wireless access point connected to a home network, such as wireless access point 112h of FIG. 1. The wireless access point 610 may be physically connected through a wired pathway to home-networking gateway 615, such as home-networking gateway 115 of FIG. 1, home-networking gateway 215 of FIG. 2, or home-networking gateway 315 of FIG. 3.

The process 600 begins when the wireless access point 610 establishes communications with the home-networking gateway 615 over a wired communications pathway (step 630w). This may be accomplished, for example, as described previously with respect to step 530 of FIG. 5.

The home-networking gateway 615 accesses wireless configuration information (step 630g). This may be accomplished, for example, as described previously with respect to step 540 of FIG. 5.

The home-networking gateway 615 sends the wireless configuration information accessed in step 630g to the wireless access point 610 (step 640g). This may be accomplished, for example, as described above with respect to step 550 of FIG. 5.

The wireless access point 610 receives the wireless configuration information (step 640w) and modifies its configuration based on the received wireless configuration information (step 645w). For example, the wireless access point 610 may update a configuration table (or otherwise modify the configuration parameters) with the wireless configuration information received. Alternatively or additionally, the home-networking gateway 615 may act as a configuration proxy and directly modify the configuration table or parameters on the wireless access point 610.

The wireless access point 610 sends to the home-networking gateway 615 an acknowledgment that the wireless configuration settings have been modified (step 650w). The home-networking gateway 615 receives the acknowledgment (step 650g).

In some implementations, the home-networking gateway 615 may determine whether the wireless access point 610 has been previously configured. For example, the home-networking gateway 615 may access wireless configuration information and send the wireless configuration information to the wireless access point only when the wireless access point has not been previously configured or has been previously configured with different configuration information.

Using the process 600, a wireless access point may be configured transparently to the user such that user action, response or other types of intervention by the user to enable configuration are unnecessary (other than connecting the wireless access point and host-networking gateway using a wire or other physical connection). In some implementations, the home-networking gateway automatically may configure the wireless access point in response to user confirmation that the wireless access point is to be configured.

Figure 7:
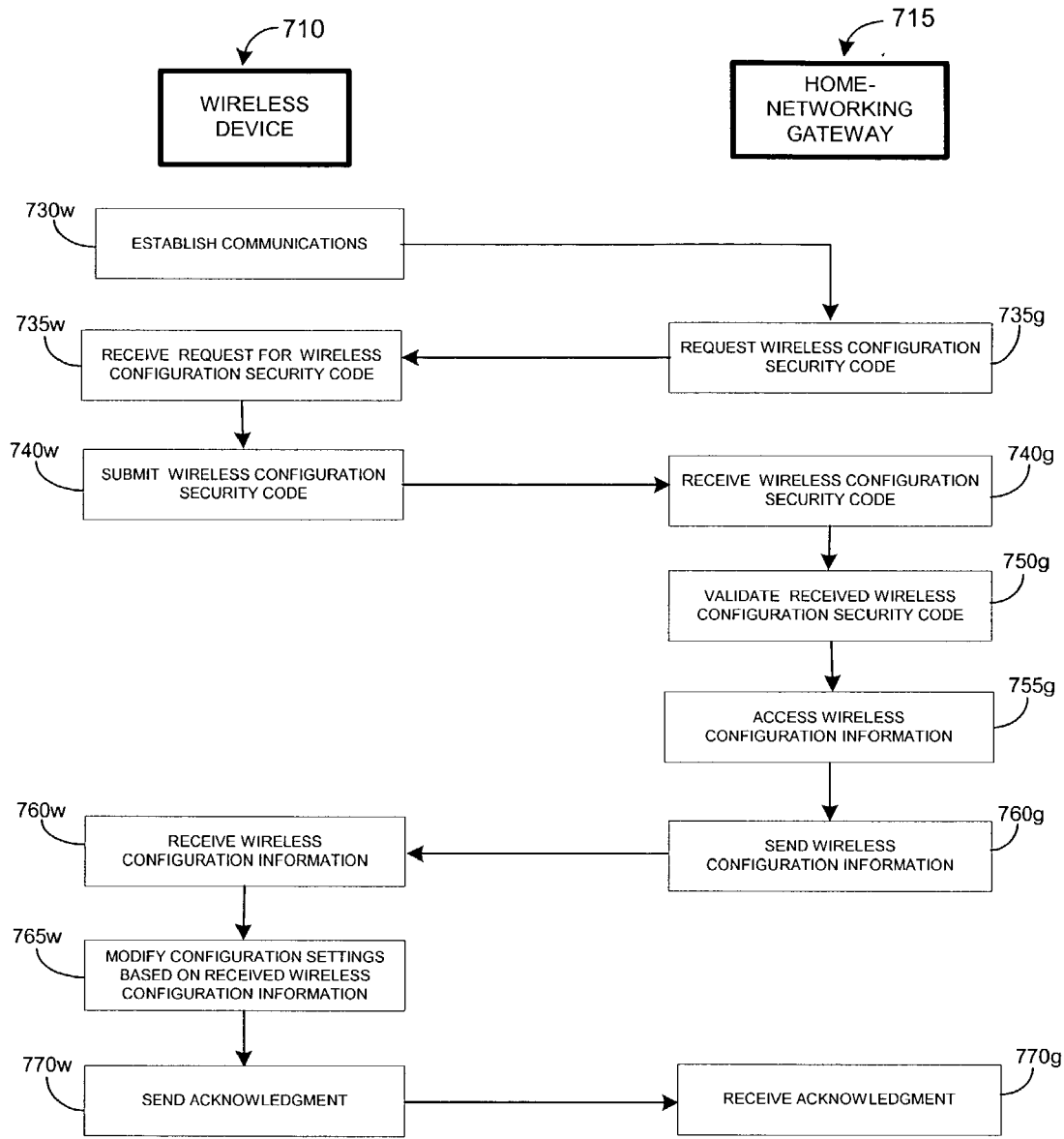
FIG. 7 is a block diagram illustrating communications between a wireless device and a home-networking gateway to configure the wireless device.

FIG. 7 depicts a process 700 for communicating between a wireless device 710 and a home-networking gateway 715 to configure the wireless device 710. In general, the wireless device 710 may be configured by the home-networking gateway 715 when the home-networking gateway 715 receives a security code that is available only to an operator of the home-networking gateway that is within the premises in which the home-networking gateway is located.

A security code may be available because the security code is published and perceivable only to an operator of the home-networking gateway 715 that is within the premises in which the home-networking gateway 715 is located. The operator may enter the security code in response to a prompt or other request from the home-networking gateway 715. For example, a security code may be imprinted or otherwise attached to the case of the home-networking gateway 715 and may be entered by a home-networking gateway operator into the wireless device through a user interface. A label may be placed on the home-networking gateway 715 that identifies the security code and enables the operator to enter the security code in response to a prompt by the home-networking gateway 715.

Additionally or alternatively, the operator may be able to display the security code using the home-networking gateway 715 and enter the displayed code into the wireless device in response to a prompt or other type of request by the home-networking gateway 715. The home-networking gateway 715 may access a security code that has been programmed into (or otherwise stored on) the home-networking gateway 715 before delivery to the owner of the home-networking gateway. For example, the home-networking gateway 715 may be programmed or otherwise configured with the security code at a factory or at a distribution point. The home-networking gateway 715 also may access a security code that is stored on a removable magnetic, optical or solid state storage device associated with the home-networking gateway.

Conversely, a security code also may be available to the wireless device through the use of removable storage that contains the security code and the security code may not be known by the home-networking gateway operator. For example, the wireless device 710 may determine the security code to be submitted by accessing removable storage on which the security code has been stored. For instance, the security code may be programmed into a hardware key which may be made available to the home-networking gateway operator and which may be physically accessed by the wireless device to enable access. In some cases, the removable media may be a wireless communications card on which the home-networking gateway stores the wireless configuration information.

The wireless device 710 may be a wireless device that is capable of communicating with a home network, for example, by communicating with a wireless access point, such as wireless access point 112h of FIG. 1, or with a home-networking gateway that includes wireless communication capabilities. The wireless device 610 also may have a capability to communicate over a wired connection to a home-networking gateway. For example, the wireless device 610 may be a laptop computer, such as laptop computer 112*f*, or a PDA, such as PDA 112*g*, that may be equipped with both wireless and wired communication capabilities. The wireless device 710 is physically connected through a wired communications pathway to the home-networking gateway 715, which may correspond, for example, to the home-networking gateway 115 of FIG. 1, the home-networking gateway 215 of FIG. 2, the home-networking gateway 315 of FIG. 3, or the home-networking gateway 615 of FIG. 6.

The process 700 begins when the wireless device 710 establishes communications over the wired communications pathway with the home-networking gateway 715 (step 730*w*). The wired communications pathway may be a wired communications pathway that uses a network communications pathway. The wired communications pathway also may be a wired communications pathway that may be provided through a wire specifically designed to connect a wireless access point to a home-networking gateway and not designed for general network communications.

The home-networking gateway 715 requests provision of a wireless configuration security code from the wireless device 710 (step 735*g*).

The wireless device 710 receives the request (step 735*w*) and submits the wireless configuration security code (step 740*w*). The wireless configuration security code may be submitted through the input of a security code by the home-networking gateway operator in response to a prompt or other type of request. The wireless configuration security code may be submitted when the wireless device 710 accesses a removable storage device that stores the security code.

The home-networking gateway receives the wireless configuration security code (step 740*g*) and validates the received wireless configuration security code (step 750*g*). The home-networking gateway may validate the received wireless configuration security code by comparing the received security code with a security code accessible to (or otherwise known to) the home-networking gateway 715 (e.g., a trusted security code). The received security code is valid when both security codes match. When the home-networking gateway 715 is not able to validate the submitted security code, the process 700 ends.

When the home-networking gateway 715 is able to validate the received security code, the home-networking gateway 715 accesses wireless configuration information (step 755*g*). For example, the home-networking gateway 715 may store wireless configuration information, as described previously with respect to home-networking gateway 115 of FIG. 1. The accessed wireless configuration information may include, for example, a security key (e.g., a WEP key), a network name (such as a SSID), a list of devices permitted to access the network, and other information needed to configure the device to work on the wireless home network.

The home-networking gateway 715 sends the accessed wireless configuration information to the wireless device (step 760*g*). The wireless device 710 receives the wireless configuration information (step 760*w*) and modifies the configuration information previously stored by the wireless device (step 765*w*), to the extent that it exists. For example, the wireless device 710 may update a configuration table (or otherwise modify the configuration parameters) with the wireless configuration information received. Alternatively or additionally, the home-networking gateway 715 may act as a configuration proxy and modify the configuration table or parameters on the wireless device 710. In some implementations, the wireless device 710 may include more than one set of configuration settings. The set of configuration settings used by the wireless device 710 may be based on the network identifier of the wireless network with which the wireless device 710 is communicating. For example, a laptop computer may store a set of configuration settings to communicate with a wireless network at an office and may also store a different set of configuration settings to communicate with a wireless network at a residence or home. The laptop computer may communicate with either the office network or the home network using the appropriate settings.

The wireless device 710 sends to the home-networking gateway 715 an acknowledgment that the wireless configuration settings have been modified (step 770*w*). The home-networking gateway 615 receives the acknowledgment (step 770*g*). When the home-networking gateway 715 does not receive an acknowledgment, the home-networking gateway 715 may take one of several actions, such as re-sending the wireless configuration information to the wireless device 710 or sending an electronic mail message to a user account to notify the user that an acknowledgment was not received. In some implementations, the wireless device 710 may pull information from the home-networking gateway 715 in addition to or in lieu of the home-networking gateway sending the wireless configuration information in step 760*g*.

Alternatively, a memory card, a memory key, or another type of removable storage device may be used to simulate or facilitate communications between the wireless device 710 and the home-networking gateway 715. For example, an operator of the home-networking gateway 715 may insert the removable storage device into to the home-networking gateway 715. The home-networking gateway 715 may access the security code and store the security code on the inserted removable storage device. After storage is complete, the operator may remove the removable storage device from the home-networking gateway and insert the removable storage device into the wireless device. The wireless device may access the security code and provide the accessed security code to the home-networking gateway 715.

In some implementations, the operator may insert a removable storage device configuration card into the home-networking gateway (or other device, such as a wireless access point) and the home-networking gateway may access the stored wireless configuration information and copy the wireless configuration to the removable storage device without requiring the wireless device to provide a security code. The operator may remove the removable storage device from the home-networking gateway for use in transporting the configuration information to a wireless device. In some implementations, the removable storage media may be a communications card for use by the wireless device 710. The home-networking gateway operator may insert the communications card in the wireless device 710 to enable wireless communications between the wireless device 710 and the home-networking gateway 715.

The process 700 enables several advantageous features, some of which are described below. For example, only users with physical access to the home-networking gateway in the residence are able to access the configuration information for the home network (e.g., the wireless configuration information is not broadcast over a wireless network).

In some implementations, a wireless access point or other device may perform the functions described as being performed by the home-networking gateway 715.

Although the techniques and concepts have been described in which a host system stores configuration information and performs a proxy configuration service for a wireless device, a wireless access point, or a home-networking gateway, a trusted system that may not necessarily be in a host-client relationship with the home-networking gateway may be used in place of the described host system. Another type of trusted computing device also may be used to perform the described techniques and concepts. For example, a general-purpose computer accessible to the network, such as in a peer-to-peer relationship, or another trusted computer system may be used to perform the functions described as being performed by the host system.

Although the techniques and concepts have been described in which a user account is authenticated and associated with information for a home-networking gateway or other communication device, the user account does not necessarily need to be a subscriber account. The techniques and concepts described with respect to a user account are applicable to a user identity or an operator operating a device or a home-networking gateway.

The techniques and concepts are applicable to home network devices other than a home-networking gateway. For example, a router, a digital hub, a general-purpose computer, or a single-purpose configuration management device may perform the functions described as being performed by the home-networking gateway.

Implementations may include a method or process, an apparatus or system, or computer software on a computer medium. It will be understood that various modifications may be made that still fall within the following claims. For example, advantageous results still could be achieved if steps of the disclosed techniques were performed in a different order and/or if components in the disclosed systems were combined in a different manner and/or replaced or supplemented by other components.

What is claimed is:

1. A method for migrating home-networking configuration information from one router to another router, the method comprising:
    receiving, at a trusted system, home-networking configuration information from a first router on a home network;
    storing the received home-networking configuration information on the trusted system;
    receiving, at the trusted system, an indication that the received home-networking configuration information is to be associated with a user identity that corresponds to a user of the home network;
    in response to receiving the indication that the received home-networking configuration information is to be associated with the user identity that corresponds to the user of the home network, associating the home-networking configuration information that was received from the first router with the user identity that corresponds to the user of the home network;
    establishing a communications session between a user device connected to the home network and the trusted system through a second router that is on the home network and that is located between the user device and the trusted system;
    determining that the communications session is associated with the user identity that corresponds to the user of the home network;
    determining that the home-networking configuration information that was received from the first router and that is associated with the user identity that corresponds to the user of the home network is not maintained on the second router; and
    based on a determination that the communications session is associated with the user identity that corresponds to the user of the home network and a determination that the home-networking configuration information that was received from the first router and that is associated with the user identity that corresponds to the user of the home network is not maintained on the second router, accessing the home-networking configuration information stored on the trusted system and sending the accessed home-networking configuration information to the second router.

2. The method of claim 1 further comprising removing the first router from the home network and replacing the first router on the home network with the second router.

3. The method of claim 1 further comprising configuring the second router based on the sent home-networking configuration information.

4. The method of claim 1 further comprising associating the second router with the user identity that corresponds to the user of the home network.

5. The method of claim 4 further comprising receiving a confirmation from the user that corresponds to the user identity confirming that the second router should be associated with the user identity, wherein the second router is associated with the user identity that corresponds to the user of the home network in response to receiving the confirmation.

6. The method of claim 4 wherein associating the second router with the user identity that corresponds to the user of the home network comprises associating the second router with the user identity that corresponds to the user of the home network in a manner that does not require user intervention.

7. The method of claim 1 wherein the user identity comprises a master account, a family account, or a supervisory account.

8. The method of claim 1 wherein the home-networking configuration information comprises a default parental control level for one or more devices that connect to the trusted system through the second router.

9. The method of claim 1 wherein the home-networking configuration information comprises a parental control level for a particular device that connects to the trusted system through the second router.

10. The method of claim 1 wherein the home-networking configuration information comprises an access restriction for a particular device that connects to the trusted system through the second router.

11. The method of claim 1 wherein the home-networking configuration information comprises one or more of identifying information for a router, device information used to configure the second router, wireless configuration information used to configure wireless devices and wireless access points to communicate with the second router, and protocol information used to configure the second router, wireless devices, and wireless access points.

12. The method of claim 1 wherein the trusted system is a system provided by an Internet service provider or a system provided by an Internet access provider.

13. The method of claim 1 further comprising receiving a confirmation from the user that corresponds with the user identity confirming that the home-networking configuration information should be sent to the second router, wherein the home-networking configuration information stored on the trusted system is accessed and sent to the second router based on receiving the confirmation in addition to the determination that the communications session is associated with the user identity that corresponds to the user of the home network and the determination that the home-networking configuration information is not maintained on the second router.

14. The method of claim 1 wherein accessing home-networking configuration information comprises accessing home-networking configuration information transparently to the user that corresponds to the user identity.

15. The method of claim 1 wherein sending the accessed home-networking configuration information comprises sending the accessed home-networking configuration information transparently to the user that corresponds to the user identity.

16. A method for migrating configuration information based on user identity information, the method comprising:
receiving, at a trusted system and from a previous router on a home network, configuration information associated with a user identity;
storing, at the trusted system, the configuration information associated with the user identity;
establishing, on behalf of the user identity, a communications session between a user device connected to the home network and the trusted system through a new router on the home network that replaced the previous router on the home network, the new router being located between the user device and a trusted system;
transmitting an indication that the communications session was established on behalf of the user identity from the new router to the trusted system;
in response to transmission of the indication that the communications session was established on behalf of the user identity to the trusted system, receiving, at the new router and from the trusted system, the stored configuration information that is associated with both the previous router and the user identity;
storing the received configuration information on the new router; and
using the stored configuration information to configure a device accessible to the home network.

17. The method of claim 16 wherein receiving the configuration information at the new router comprises receiving the configuration information at the new router automatically in response to confirmation from the user that corresponds to the user identity that confirms configuration information should be associated with the new router.

18. The method of claim 16 wherein receiving the configuration information at the new router comprises receiving the configuration information at the new router transparently to the user that corresponds to the user identity.

19. The method of claim 16 wherein storing the received configuration information at the new router comprises storing the received configuration information at the new router automatically in response to confirmation from the user that corresponds to the user identity that confirms configuration information should be associated with the new router.

20. The method of claim 16 wherein storing the received configuration information at the new router comprises storing the received configuration information at the new router transparently to the user that corresponds to the user identity.

21. The method of claim 16 further comprising determining that the user identity is authorized to access the trusted system, wherein receiving the configuration information at the new router and storing the configuration information at the new router comprise receiving the configuration information at the new router and storing the configuration information at the new router based on a determination that the user identity is authorized to access the trusted system.

22. The method of claim 16 wherein using the stored configuration information to configure the device accessible to the home network comprises configuring a wired device.

23. The method of claim 16 wherein the new router physically replaced the previous router.

24. The method of claim 16 wherein:
the new router and the previous router comprise the same physical router, and
the new router logically replaced the previous router in that configuration information maintained by the new router differs from configuration information maintained by the previous router.

25. The method of claim 16 wherein using the stored configuration information to configure the device accessible to the home network comprises configuring a wireless device.

26. The method of claim 16 wherein using the stored configuration information to configure the device accessible to the home network comprises configuring a wireless access point.

27. The method of claim 16 wherein using the stored configuration information to configure the device accessible to the home network comprises configuring a router.

28. A system for migrating home-networking configuration from one router to another router, the system comprising a processor connected to a storage device, wherein the processor is configured to:
receive home-networking configuration information from a first router on a home network,
store the received home-networking configuration information on a trusted system,
receive an indication that the received home-networking configuration information is to be associated with a user identity that corresponds to a user of the home network;
in response to reception of the indication that the received home-networking configuration information is to be associated with the user identity that corresponds to the user of the home network, associate the home-networking configuration information that was received from the first router with the user identity that corresponds to the user of the home network,
establish a communications session between a user device connected to the home network and the trusted system through a second router that is on the home network and that is located between the user device and the trusted system,
determine that the communications session is associated with the user identity that corresponds to the user of the home network,
determine that the home-networking configuration information that was received from the first router and that is associated with the user identity that corresponds to the user of the home network is not maintained on the second router; and
access the home-networking configuration information stored on the trusted system and send the accessed home-networking configuration information to the second router based on a determination that the communications session is associated with the user identity that corresponds to the user of the home network and a determination that the home-networking configuration information is not maintained on the second router.

29. The system of claim 28 wherein the processor is further configured to configure the second router based on the sent home-networking configuration information.

30. The system of claim 28 wherein the processor is further configured to associate the second router with the user identity that corresponds to the user of the home network.

31. The system of claim 30 wherein the processor is further configured to:
receive a confirmation from the user that corresponds to the user identity that confirms that the second router should be associated with the user identity; and associate the second router with the user identity that corresponds to the user of the home network based on the trusted system receiving the confirmation.

32. The system of claim 30 wherein the processor is further configured to associate the second router with the user identity that corresponds to the user of the home network transparently to the user that corresponds to the user identity.

33. The system of claim 28 wherein the user identity comprises a master account, a family account, or a supervisory account.

34. The system of claim 28 wherein the home-networking configuration information comprises a default parental control level for one or more devices that connect to the trusted system through the second router.

35. The system of claim 28 wherein the home-networking configuration information comprises a parental control level for a particular device that connects to the trusted system through the second router.

36. The system of claim 28 wherein the home-networking configuration information comprises an access restriction for a particular device that connects to the trusted system through the second router.

37. The system of claim 28 wherein the home-networking configuration information comprises one or more of identifying information for a router, device information used to configure the second router, wireless configuration information used to configure wireless devices and wireless access points to communicate with the second router, and protocol information used to configure the second router, wireless devices, and wireless access points.

38. The system of claim 28 wherein the trusted system is a system provided by an Internet service provider or a system provided by an Internet access provider.

39. The system of claim 28 wherein the processor is further configured to:
receive a confirmation from the user that corresponds to the user identity confirming that the home-networking configuration information should be sent to the second router; and
access and send the home-networking configuration information stored on the trusted system to the second router based on the trusted system receiving the confirmation in addition to the determination that the communications session is associated with the user identity that corresponds to the user of the home network and the determination that the home-networking configuration information is not maintained on the second router.

40. The system of claim 28 wherein the processor is further configured to access home-networking configuration information in a manner that does not require user intervention.

41. The system of claim 28 wherein the processor is further configured to send the accessed home-networking configuration information transparently to the user that corresponds to the user identity.

42. A system for migrating configuration information based on user identity information, the system comprising a processor connected to a storage device, wherein the processor is configured to:
establish a communications session between a user device and a trusted system using a router on a home network that replaced a previous router on the home network, and that does not store configuration information that is associated with both a user identity of a user of the user device and the previous router,
transmit an indication of the user identity that corresponds to the user of the user device from the router to the trusted system,
in response to transmission of the indication of the user identity that corresponds to the user of the user device to the trusted system, receive, at the router, configuration information that is stored on the trusted system and that is associated with both the previous router that was replaced by the router and the user identity that corresponds to the user of the user device,
store the received configuration information on the router, and
use the stored configuration information to configure a device accessible to the home network.

43. The system of claim 42 wherein the processor is further configured to receive configuration information transparently to the user that corresponds to the user identity.

44. The system of claim 42 wherein the user device comprises a wired device.

45. The system of claim 42 wherein the user device comprises a wireless device.

46. The system of claim 42 wherein the user device comprises a wireless access point.

47. The system of claim 42 wherein the user device comprises a router.

48. A computer-readable medium having embodied thereon a computer program configured to migrate home-networking configuration information from one router to another router, the medium comprising one or more code segments configured to:
receive, at a trusted system, home-networking configuration information from a first router on a home network;
store the received home-networking configuration information on the trusted system;
receive, at the trusted system, an indication that the received home-networking configuration information is to be associated with a user identity that corresponds to a user of the home network;
in response to receiving the indication that the received home-networking configuration information is to be associated with the user identity that corresponds to the user of the home network, associate the home-networking configuration information that was received from the first router with a user identity that corresponds to a user of the home network;
establish a communications session between a user device connected to the home network and the trusted system through a second router that is on the home network and that is located between the user device and the trusted system;
determine that the communications session is associated with the user identity that corresponds to the user of the home network;
determine that the home-networking configuration information that was received from the first router and that is associated with the identity that corresponds to the user of the home network is not maintained on the second router; and
based on a determination that the communications session is associated with the user identity that corresponds to the user of the home network and a determination that the home-networking configuration information that was received from the first router and that is associated with the user identity that corresponds to the user of the home network is not maintained on the second router, access the home-networking configuration information stored on the trusted system and send the accessed home-networking configuration information to the second router.

49. The computer-readable medium of claim 48 further comprising code segments configured to configure the second router based on the sent home-networking configuration information.

50. The computer-readable medium claim 48 further comprising code segments configured to associate the second router with the user identity that corresponds to the user of the home network.

51. The computer-readable medium of claim 50 further comprising code segments configured to receive a confirmation from the user that corresponds to the user identity confirming that the second router should be associated with the user identity, wherein the code segments configured to associate the second router with the user identity comprise code segments configured to associate the second router with the user in response to receiving the confirmation.

52. The computer-readable medium of claim 50 wherein the code segments configured to associate the second router with the user identity that corresponds to the user of the home network comprise code segments configured to associate the second router with the user identity that corresponds to the user of the home network in a manner that does not require user intervention.

53. The computer-readable medium of claim 48 wherein the home-networking configuration information comprises a default parental control level for one or more devices that connect to the trusted system through the second router.

54. The computer-readable medium of claim 48 wherein the home-networking configuration information comprises a parental control level for a particular device that connects to the trusted system through the second router.

55. The computer-readable medium of claim 48 wherein the home-networking configuration information comprises an access restriction for a particular device that connects to the trusted system through the second router.

56. The computer-readable medium of claim 48 wherein the home-networking configuration information comprises one or more of identifying information for a router, device information used to configure the second router, wireless configuration information used to configure wireless devices and wireless access points to communicate with the second router, and protocol information used to configure the second router, wireless devices, and wireless access points.

57. The computer-readable medium of claim 48 wherein the trusted system is a system provided by an Internet service provider or a system provided by an Internet access provider.

58. The computer-readable medium of claim 48 further comprising code segments configured to receive a confirmation from the user that corresponds with the user identity confirming that the home-networking configuration information should be sent to the second router, wherein the code segments configured to access and send the home-networking configuration information stored on the trusted system to the second router are configured to access and send the home-networking configuration information stored on the trusted system to the second router based on receiving the confirmation in addition to the determination that the communications session is associated with the user identity that corresponds to the user of the home network and the determination that the home-networking configuration information is not maintained on the second router.

59. The computer-readable medium of claim 48 wherein the code segments configured to access home-networking configuration information comprise code segments configured to access home-networking configuration information in a manner that does not require user intervention.

60. The computer readable medium of claim 48 wherein the code segments configured to send the accessed home-networking configuration information comprise code segments configured to send the accessed home-networking configuration information transparently to the user that corresponds to the user identity.

61. A computer-readable medium having embodied thereon a computer program configured to migrate configuration information based on user identity information, the medium comprising one or more code segments configured to:

receive, at a trusted system and from a previous router on a home network, configuration information associated with a user identity;

store, at the trusted system, the configuration information associated with the user identity;

establish, on behalf of the user identity, a communications session between a user device connected to the home network and the trusted system through a new router on the home network that replaced the previous router on the home network, the new router being located between the user device and a trusted system;

transmit an indication that the communications session was established on behalf of the user identity from the new router to the trusted system;

in response to transmission of the indication that the communications session was established on behalf of the user identity to the trusted system, receive, at the new router and from the trusted system, the stored configuration information that is associated with both the previous router and the user identity;

store the received configuration information on the new router; and use the stored configuration information to configure a device accessible to the home network.

62. The computer-readable medium of claim 61 wherein the code segments configured to receive configuration information comprise code segments configured to receive configuration information transparently to the user that corresponds to the user identity.

63. The computer-readable medium of claim 61 wherein the code segments configured to use the stored configuration information to configure the device accessible to the home network comprise code segments configured to configure a wired device.

64. The computer-readable medium of claim 61 wherein the code segments configured to use the stored configuration information to configure the device accessible to the home network comprise code segments configured to configure a wireless device.

65. The computer-readable medium of claim 61 wherein the code segments configured to use the stored configuration information to configure the device accessible to the home network comprise code segments configured to configure a wireless access point.

66. The computer-readable medium of claim 61 wherein the code segments configured to use the stored configuration information to configure the device accessible to the home network comprise code segments configured to configure a router.

67. A method for migrating home-networking configuration information from a first router to a second router on a home network, the method comprising:

receiving, at a trusted system, home-networking configuration information from the first router on the home network;

storing the received home-networking configuration information on the trusted system;

receiving, at the trusted system, an indication that the received home-networking configuration information is to be associated with a user identity that corresponds to a user of the home network;

in response to receiving the indication that the received home-networking configuration information is to be associated with the user identity that corresponds to the user of the home network, associating the home-networking configuration information that was received from the first router with the user identity that corresponds to the user of the home network;

establishing a communications session between a user device connected to the home network and the trusted system through the second router that is on the home network and that is located between the user device and the trusted system;

determining that the communications session is associated with the user identity that corresponds to the user of the home network;

determining whether to send the home-networking configuration information that was received from the first router and that is associated with the user identity that corresponds to the user of the home network to the second router; and based on a determination that the communications session is associated with the user identity that corresponds to the user of the home network and a determination to send the home-networking configuration information that was received from the first router and that is associated with the user identity that corresponds to the user of the home network to the second router, accessing the home-networking configuration information stored on the trusted system and sending the accessed home-networking configuration information to the second router.

* * * * *